(12) United States Patent
Siddiqui et al.

(10) Patent No.: US 9,280,604 B2
(45) Date of Patent: Mar. 8, 2016

(54) UNIFIED COMMUNICATION AUDIT TOOL

(71) Applicant: Cisco Technology, Inc., San Jose, CA (US)

(72) Inventors: Talal Ahmad Siddiqui, San Jose, CA (US); Ramesh Kumar Kaza, San Jose, CA (US); Stuart Edward Biggs, San Jose, CA (US); Sanjay Jani, San Jose, CA (US); Narayanan Thyagarajan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/590,120

(22) Filed: Jan. 6, 2015

(65) Prior Publication Data
US 2015/0112974 A1 Apr. 23, 2015

Related U.S. Application Data

(63) Continuation of application No. 13/921,561, filed on Jun. 19, 2013, now Pat. No. 8,959,074, which is a continuation of application No. 12/036,906, filed on Feb. 25, 2008, now Pat. No. 8,473,519.

(51) Int. Cl.
*G06F 17/30* (2006.01)
*G06F 11/34* (2006.01)
*H04L 29/00* (2006.01)
(Continued)

(52) U.S. Cl.
CPC ...... *G06F 17/30864* (2013.01); *G06F 11/3409* (2013.01); *G06F 17/30* (2013.01); *G06F 17/303* (2013.01); *G06F 17/30424* (2013.01); *H04L 29/00* (2013.01); *H04L 41/0856* (2013.01); *H04L 67/02* (2013.01); *H04L 41/0213* (2013.01)

(58) Field of Classification Search
CPC .................................................. G06F 17/30
USPC ................................................. 707/600–899
See application file for complete search history.

(56) References Cited

U.S. PATENT DOCUMENTS

| 7,100,195 B1 | 8/2006 | Underwood |
|---|---|---|
| 8,473,519 B1 | 6/2013 | Siddiqui |
| 2005/0216490 A1 | 9/2005 | Dias et al. |

(Continued)

OTHER PUBLICATIONS

Final Office Action in U.S. Appl. No. 12/036,906, mailed Oct. 11, 2011, 19 pages.

(Continued)

*Primary Examiner* — Isaac M Woo
(74) *Attorney, Agent, or Firm* — Edell, Shapiro & Finnan, LLC

(57) ABSTRACT

Providing for dynamic auditing of components of a communication network is provided herein. By way of example, network components can be queried by way of dynamic and intelligent application programming interface (APIs) queries to extract data for the network components. Such data can then be compared with best practice rules to identify potential enhancements to efficiency or scalability of such components. In some aspects, an audit report can be output summarizing identified enhancements. In other aspects, data can be written to an updated component according to protocols suited to such component. Accordingly, an audit can provide feedback in light of best practices or can be utilized to dynamically upgrade a legacy system to newer system software and/or hardware components.

20 Claims, 10 Drawing Sheets

(51) Int. Cl.
*H04L 12/24* (2006.01)
*H04L 29/08* (2006.01)

(56) References Cited

U.S. PATENT DOCUMENTS

| | | | |
|---|---|---|---|
| 2006/0218634 A1 | 9/2006 | Sodhi | |
| 2007/0169049 A1 | 7/2007 | Gingell et al. | |
| 2008/0104092 A1 | 5/2008 | Cummins | |
| 2008/0244148 A1 | 10/2008 | Nix, Jr. et al. | |
| 2009/0083216 A1* | 3/2009 | Dampier | 707/2 |

OTHER PUBLICATIONS

Non-Final Office Action in U.S. Appl. No. 12/036,906, mailed Jan. 25, 2011, 16 pages.

Non-Final Office Action in U.S. Appl. No. 12/036,906, mailed Jun. 18, 2010, 13 pages.

Notice of Allowance in U.S. Appl. No. 12/036,906, mailed Feb. 26, 2013, 7 pages.

Response to Final Office Action in U.S. Appl. No. 12/036,906, mailed Oct. 11, 2011, filed Jan. 11, 2012, 14 pages.

Response to Non-Final Office Action in U.S. Appl. No. 12/036,906, mailed Jan. 25, 2011, filed Jun. 27, 2011, 13 pages.

Response to Non-Final Office Action in U.S. Appl. No. 12/036,906, mailed Jun. 18, 2010, filed Oct. 18, 2010, 11 pages.

"Cisco Unified Communications Manager," From Wikipedia, the free encyclopedia, last accessed Jun. 3, 2008, pp. 1-7.

Non-Final Office Action in U.S. Appl. No. 13/921,561, mailed Jun. 25, 2014, 9 pages.

Response to Non-Final Office Action in U.S. Appl. No. 13/921,561, mailed Jun. 25, 2014, filed Sep. 23, 2014, 10 pages.

Notice of Allowance in U.S. Appl. No. 13/921,561, mailed Oct. 9, 2014, 8 pages.

* cited by examiner

UNIFIED COMMUNICATION AUDIT TOOL

CROSS REFERENCE TO RELATED APPLICATIONS

This application is a continuation of U.S. Non-Provisional patent application Ser. No. 13/921,561, entitled "Unified Communication Audit Tool" and filed on Jun. 19, 2013, pending, which is a continuation of U.S. Non-Provisional application Ser. No. 12/036,906, filed Feb. 28, 2008, now U.S. Pat. No. 8,473,519, the entirety of which is incorporated herein by reference.

BACKGROUND

Network service providers utilize various types of electronic equipment to facilitate remote electronic communication. In addition, various types of communication services, including data communication, voice over Internet Protocol (VoIP), circuit-switched communication, and so on, can require different types of electronic equipment, or equipment configured according to different protocols. For instance, electronic equipment servicing a VoIP-based network can require a first protocol and set of application programming interface (API), whereas electronic equipment servicing a circuit-switched-based network can require a second protocol and a second set of APIs.

Size of a provider's network typically corresponds to a number of subscribers associated with the provider. Likewise, numbers of electronic components (e.g., switches, routers, servers, hubs, gateways, support databases, and so on) also correspond to the size of the provider's network. A single service provider can have dozens of support databases, for instance, as a subscriber base requires. Since each type of device can have different software, protocols, APIs, etc., an interface to all of the components of a typical network can be fairly complex.

As types of remote communication become more diverse, management software controlling networks and associated equipment also becomes more diverse. In addition, the rate at which software changes can be measured in months or only a few years. For a large network, however, keeping abreast with current changes in software can be expensive. Often an operator maintains various types of management software within a network, and upgrades the software as new components are added (e.g., based on component repair or replacement or on subscriber growth).

As a specific example, communication servers and storage databases can utilize various operating systems and management modules depending on a type of communication service associated with such equipment. A database operating system for VoIP phone calling can store configuration details for routing calls, subscriber directory information, connectivity information, traffic engineering guidelines, best practice rules for providing interconnectivity, and the like. Although each type of equipment (e.g., switch, support database) will typically utilize a common operating system, such is not necessarily the case, as older versions of the operating systems often exist simultaneously in a network. In addition, as VoIP standards change, software changes to incorporate protocols accordingly. Further, as new technology becomes available (e.g., VoIP conference calling), software is updated to incorporate new communication features. Updating software in physical network components, however, can be much more time consuming than the software upgrades. In addition, cost can be prohibitive to upgrade many system components at once. Unfortunately, conventional systems do not provide for efficient and intelligent transfer of data, data structures and/or data configuration information in unified communication applications from one network component to another to meet advancements in technology or updates to communication standards.

DESCRIPTION OF EXAMPLE EMBODIMENTS

Overview

Figure 1:
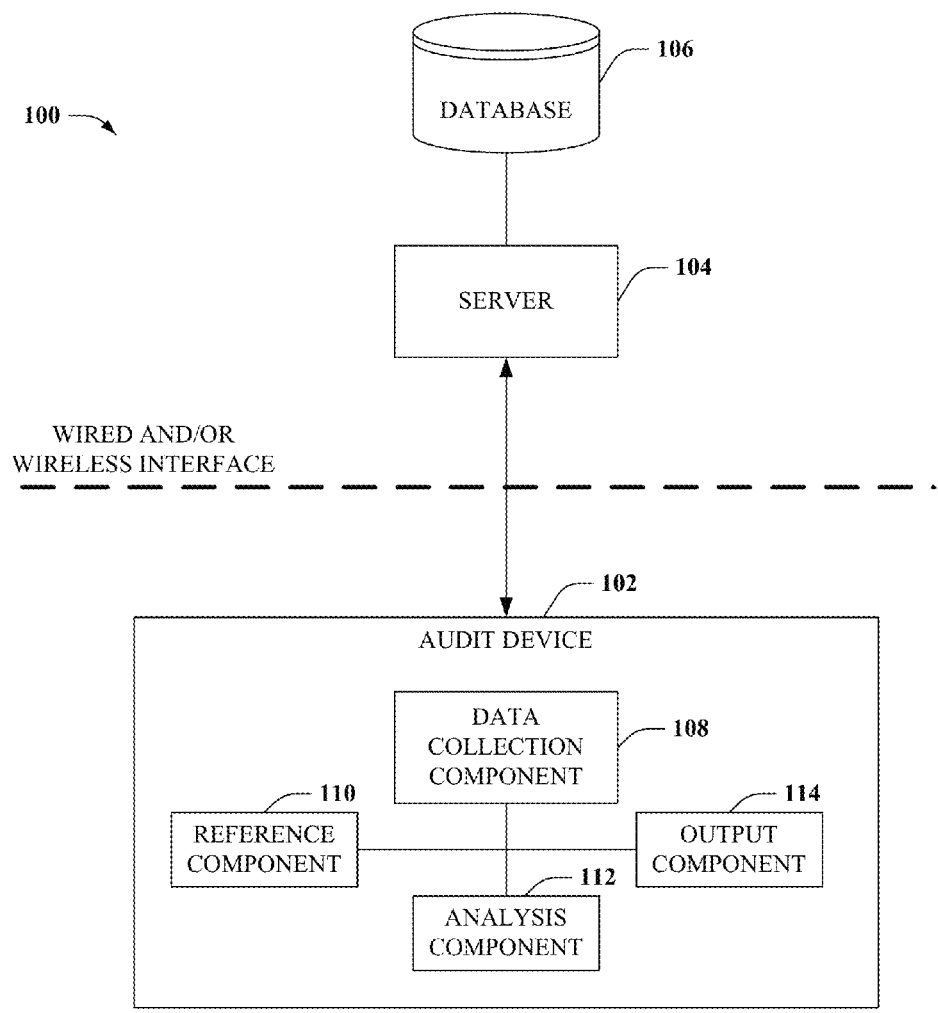
FIG. 1 illustrates a block diagram of a sample system that can audit network equipment and output best practice recommendations.

The following presents a simplified overview in order to provide a basic understanding of some aspects of the claimed subject matter. This overview is not an extensive overview. It is not intended to identify key/critical elements or to delineate the scope of the claimed subject matter. Its sole purpose is to present some concepts in a simplified form as a prelude to the more detailed description that is presented later.

The disclosed subject matter provides for dynamic auditing of components of a communication network. In some aspects, an audit can provide suggestions corresponding to rules of best practice to increase efficiency or scalability of network components. The audit can utilize various exposed or secure application programming interfaces (APIs) to provide accessibility to at least a substantial portion of the component while reducing load on active devices at low levels. Accordingly, the dynamic auditing can be engaged while a component is performing other tasks in the network environment.

According to some aspects, an audit report can be generated as a result of an audit to identify improvements to a network component. The audit report can be generated by extracting data or configuration information from a database and comparing extracted data/information with rules of best practice. The report can identify conditions where the network component departs from the rules of best practice, and can make suggestions as to improving those conditions.

According to at least one aspect, a concatenated feedback mechanism is employed in conjunction with performing an audit of a network component. The feedback mechanism enables information extracted from a first portion of the component to be utilized in conjunction with an interface to a second portion of the component. For instance, information extracted from a database as a result of a first API query can be shared with a second query engine, optionally utilizing a second API. Thus, the audit can interface with a complex device and improve queries to various portions of such a device based on prior query results.

According to further aspects, expedited intelligent data transfer is provided from an existing network component to another related (e.g., upgraded, new generation) network component(s). Protocols utilized to interface with a first component can be determined dynamically in conjunction with dynamic API queries to the component. Data and data configuration information can be extracted from the first component and iteratively written to the related component(s). Errors received due to iterative writing can be analyzed and applied to subsequent iterations. In such a manner, a format for writing data to a new network component (e.g., server, database) can be determined dynamically. Optionally, updated rules can be provided to auditing components as a baseline format for transferring data to a newer system. In some embodiments, best practice rules can be modified or updated in conjunction with new protocols, APIs, standards, or the like associated with the newer system. Best practices can be stored and cross-referenced at least as a function of type of system.

According to still other embodiments, a data collector can be implemented as a stand-alone executable file, separate from an analysis, reporting, and/or transfer components of an audit system. The stand-alone collector can be sent to an entity responsible for a network or component thereof to extract data from the component and generate a file. Such a data collector can be implemented by secure personnel, for instance, to minimize a security risk posed by a data extracting tool. The generated file can be encrypted and transmitted to additional components via a network interface for analysis, reporting, and/or transfer functions. Accordingly, security can be provided for audited components despite an intrusive nature of a data collection tool.

The following description and the annexed drawings set forth in detail certain illustrative aspects of the claimed subject matter. These aspects are indicative, however, of but a few of the various ways in which the principles of the claimed subject matter can be employed and the claimed subject matter is intended to include all such aspects and their equivalents. Other advantages and distinguishing features of the claimed subject matter will become apparent from the following detailed description of the claimed subject matter when considered in conjunction with the drawings.

EXAMPLE EMBODIMENTS

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system", "interface", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components, and can be as simple as a command line or a more complex Integrated Development Environment (IDE).

Disclosed is a mechanism that provides an interface to various communication infrastructure devices independent of management software implemented on such devices. The interface enables query and auditing of servers and databases associated with the infrastructure devices. Results of an audit can be used to generate a report that compares current data structures and data configurations with best practice rules. The reports can provide suggestions for improving efficiency of the infrastructure devices based on the best practice rules. In addition, an audit can be useful to port data and configuration parameters from a first server and/or database to a second server/database. For instance, porting data from a first device to a second can be useful for backup and restoration of a database. As another example, data porting can be useful to change an operating system of a device to different operating system, or upgrade software from a previous version to a newer version, etc. As used herein, communication infrastructure devices can include data management servers and/or databases, traffic engineering devices, network switches and routers, voice over Internet Protocol (VoIP) management servers/databases, video and voice meeting management devices (e.g., video and/or voice conference call servers/databases), voice and/or video message management devices, or the like, or a combination thereof.

In general, no current mechanism exists to provide consistent, efficient and dynamic access to unified applications of network support and infrastructure devices. As an example of a unified application, a call management application, a conference calling application, and a data routing application integrated on one or more network infrastructure devices (e.g., a VoIP database) can comprise a unified application. A unified application typically incorporates different communication functions along with various protocols and application programming interfaces (APIs) applicable to individual portions of the unified application. For instance, a call management and accounting database utilized to track call/connection activity for billing and mediation purposes can utilize an open database connectivity (ODBC) API and/or a structured query language (SQL) for database access. As a further example, a call management application can typically utilize simple object access protocol (SOAP) to exchange extensible markup language (XML)-based messages over a remote network (e.g., utilizing hypertext transfer protocol [HTTP] or secured hypertext transfer protocol [HTTPS].

In at least one aspect of the subject disclosure, intelligent queries to one or more portions of a network device can be performed to extract information from such device. Types of queries can include structured simple network management protocol (SNMP) polls, windows management instrumentation (WMI), grand unified socket interface (GUSI), SOAP queries, or like application API queries configured to extract data from various portions of a network device. Typically, conventional tools are limited to interfacing with one or a limited number of applications, APIs, or communication protocols. A need exists, therefore, for a network interface mechanism that can query, audit, and/or extract information from unified communication application servers, call control and network entities, and the like. In some aspects, this need is met by utilizing device queries operating in parallel to extract information in an efficient manner. In further aspects, results of one or more queries can be utilized to optimize other queries, providing increased coverage, reduced extraction time and/or reduced system load. For instance, an SNMP poll can extract software, hardware and/or firmware version information from a communications device or application and provide such data to a SOAP query.

According to one or more other aspects, provided is a unified communication interface that can utilize multiple APIs and communication protocols to interface with most or all aspects of unified network applications. For instance, a query utilizing a first API can interact with a first portion of a communication server (e.g., a billing and mediation database). In addition, a query utilizing a second API can interact with a second portion of the communication server (e.g., a call management application, conference calling application, or the like). According to further aspects, results of a first query (e.g., utilizing the first API) can be provided to a second query (e.g., utilizing the second API). Accordingly, information about an application and/or network device can be shared amongst multiple query engines. Thus, information received from a billing and usage database can be cross-referenced to intelligently configure interactions with a call management application. According to still other aspects, query engines can dynamically update query rules as information is received from various portions of a device. Therefore, an intelligent interface is provided that can increase efficiency and effectiveness of the interface based on prior interactions with one or more applications.

As an additional example of the foregoing, a communication interface can utilize and manage APIs and queries to reduce load levels on audited devices and networks. Specifically, an API framework can utilize concatenated feedback to distill information from one API and feed information to another API. Such feedback can provide maximum coverage for an interface to an application and/or network device. Such feedback and interface can also throttle queries to a device to reduce query load when network service load is high. Accordingly, impact on network services can be reduced when an audit of a device is in progress.

According to additional aspects, a unified interface can be utilized to generate audit reports. As discussed above, an interface can be utilized to intelligently query portions of a network device and to collect data, data structure information, and data configurations over one or more API interfaces. Data gathered can be compared with suitable network communication best practice rules. According to some aspects, the best practice rules can be dynamically updated depending on current best practice information (e.g., pertinent to one or more application versions) and interaction with new and/or upgraded application devices. For instance, an audit report of a VoIP database running version 1.0 of a management application can provide recommendations and highlight potential problem areas pertinent to the management application version. In addition, if it is desired to upgrade the VoIP database to version 2.0 of the management application, the audit report can adapt the best practice rules according to policies and protocols of the 2.0 version. New policies can be uploaded to an audit tool manually, or such policies can be determined dynamically via iterative data exchange with the 2.0 database (e.g., in conjunction with porting data from the version 1.0 database to the version 2.0 database). Best practice rules can be adapted to meet specific network deployment, network application upgrades, or the like.

According to some aspects, an audit tool can be separated into collection and analysis portions. Specifically, a data collector can comprise a stand-alone executable function that utilizes intelligent queries to extract data. Extracted data can then be organized into a data file. The data file can be encrypted to protect sensitive or secret information. The data file can then be forwarded via a network connection to an analysis portion of the audit tool. The analysis portion can compare information in the data file to best practice rules, as described above, and provide an output report highlighting potential inefficiencies, lack of data redundancy, stability feedback, design conformance feedback, periodic data/configuration snapshots for troubleshooting, generate as-built documents, or export/import data for system backup or upgrade, discussed below, or the like.

In accordance with still other aspects, a communication audit tool can port data and data configuration information between network systems and/or devices. Porting data can be useful for data backup and/or redundancy, or to automate system upgrades. Conventional techniques for upgrading communication device systems are largely manual. Such techniques require manual copying of data from a first database into an intermediary database. Specific information is then parsed manually by an operator, to facilitate porting data and restructuring/configuring the data in a new database. In many cases porting to a new database requires an operator to modify data structures to be compatible with rules and protocols of the new database. Accordingly, conventional upgrading is time consuming, tedious and has high overhead costs.

In contrast, the subject disclosure provides for intelligent and automated system updates. A first database can be intelligently queried to extract information from the database, as discussed above. Extracted information can then be iteratively written to a new database. Each iteration and any results provided by the new database can be examined to determine if errors exist. Subsequent iterations can then be adjusted according to the errors and results, and updated rules pertinent to the first database and the new database can be saved. Once one or more iterations are written without associated errors, the new rules can be associated with each additional iteration and remaining data can be copied to the new database in a large data dump. Accordingly, the subject disclosure provides an intelligent and dynamic mechanism to port data from a first device to a second device, despite differences in software or protocols of the devices.

As described herein, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Further, as used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Additionally, the various illustrative logics, logical blocks, modules, and circuits described in connection with the aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Additionally, at least one processor can comprise one or more modules operable to perform one or more of the steps and/or actions described herein.

Referring now to FIG. 1, illustrated is a block diagram of a system 100 that includes a network audit device 102 according to one or more aspects disclosed herein. Audit device 102 can couple with, and extract information from, network components (104, 106) and provide audit results based on best rule practices. Extracted information can be analyzed to provide an audit report pertinent to one or more analyzed systems (104, 106). Accordingly, system 100 can interface with network systems (104, 106) to help improve communication efficiency and effectiveness of such systems (104, 106).

Audit device 102 can connect to network components (104, 106) by various communication architectures, including a local bus structure, a local network, a wide area network, a remote wired and/or wireless interface, an interface to a data network such as the Internet, or a combination thereof or of the like. The audit device 102 can comprise a data collection component 108 that can query a server 104 and/or database 106 coupled with the audit device 102. Specifically, data collector 108 can obtain a type of the database 106, extract stored data, data structures, and/or data configuration information, or the like. Such information can be utilized at least in part to generate an audit report for the database 106 or server 104.

Database 106 can be any suitable network communication data structure. Examples can include a call management database, a VoIP database, a traffic engineering database, stability or backup database, or a database associated with a video or voice conference call server, a data management server, a network switch or router, VoIP management servers, usage and charging server, or a combination thereof. Server 104 can also provide various network communication functions, including call management, traffic engineering, circuit-switched or packet-switched connectivity management, billing and charging, and the like. Such devices 104, 106 can include various operating systems, interface architectures, and other applications and software utilizing various communication protocols. It should also be appreciated that server 104 and/or database 106 can be unified devices. For instance, such components 104, 106 can incorporate call management, voice/text/message mail services, charging and billing, and so on, into a single component (104, 106) or group of unified components (104, 106).

According to some aspects audit device 102 and data collection component 108 can utilize various communication protocols and APIs to interface with portions of a unified server 104 and database 106. For instance, data collection component 108 can utilize structured SNMP polls, or SOAP, WMI, GUSI, HTML, XML, ODBC/SQL, or telephone application programming interface (TAPI)/java telephony API (JTAPI) queries, or a combination thereof, as suitable to interface with various portions of network components (104, 106). As a particular example, a first query utilizing a first API can be directed toward a first portion of database 106. In addition, a second query utilizing a second API can be directed toward a second portion of database 106. Accordingly, unified devices utilizing various applications can be queried by data collector 108 in an efficient and integrated manner.

As a specific, non-limiting example of the foregoing, an ODBC/SQL query can be utilized to communicate with usage tracking and charging portions of a unified database (106). Also, a TAPI/JTAPI query can be utilized to communicate with a call messaging portion of such database (106). In addition, a structured SNMP query can be utilized to determine a type of the database (106), version information of management software and operating software, and so on. In some aspects, data collection component 108 can provide information gained from one query to other queries. For instance, an SNMP query providing version and system type information can be utilized by the ODBC/SQL and/or TAPI/JTAPI queries. Accordingly, the latter queries can be configured in accordance with the determined application versions and system types, making the queries more effective.

Audit device 102 can further include a reference component 110 that contains a list of best practice rules pertaining to configuration and storage of data. The best practice rules can be associated with configuration practices, data structure types, maintaining data/system redundancy, maintaining sufficient backup and recovery implementations, maintaining sufficient security, where suitable, and so on. Further, the rules can be pertinent to one or more applications, application versions, and/or system versions or types. For instance, a first set of rules can be correlated to a first version (e.g., version 1.0) of an operating system of database 106. Further, a second set of rules can be correlated to a second version (e.g., version 2.0) of the operating system. Accordingly, various types of applications (e.g., call management, messaging, traffic routing, and so on) and operating systems can be supported by reference component 110.

In addition to the foregoing, it should be appreciated that the best practice rules can be dynamically updated by interaction with device (104, 106) applications. For instance, if audit device 102 interfaces with database 106 and encounters a new operating system or operating system version (e.g., 3.0), existing best practice rules can be updated based on interactions with such operating system. As a more specific example, if an error is received from a new system/version, the error can be analyzed and best practice rules generated and/or updated accordingly. Thus, reference component 110 can modify existing rules or generate new rules as suitable based on interaction with new or updated systems (104, 106).

According to some embodiments, audit device 102 can include an analysis component 112 that can compare information extracted by data collector 108 to at least one best practice rule pertinent to server 104 or database 106. For instance, a rule can be referenced that is compatible with a current application operating on such devices (104, 106), or a type of such devices (104, 106). The comparison can be utilized to identify potential problem areas, potential system inefficiencies, etc. For instance, analysis component 112 can flag data configuration issues pertinent to an application or type of database 106, identify where desirable system redundancy is missing, or where improvements are possible based on the best practice rules maintained at reference component 110.

Audit device 102 can further include an output component 114 that generates a report indicating a result of the comparison performed by analysis component 112. The report can be in a spreadsheet format, database listing, word processing format, etc. Such report can be sent to an operator associated with analyzed network components (104, 106) for maintenance and/or upgrade purposes. It should be appreciated that such report can be in any suitable electronic format or hard-copy format (e.g., printout). As described, system 100 provides a mechanism to interface with unified network communication components (104, 106) and extract data from such components (104, 106) utilizing intelligent API and communication protocol calls. Further, system 100 can analyze extracted data according to dynamic best practice rules and provide a report identifying potential inefficiencies and improvement areas. Accordingly, system 100 can provide a beneficial network analysis and feedback tool for management and maintenance of various communication networks and network components (104, 106).

Figure 2:
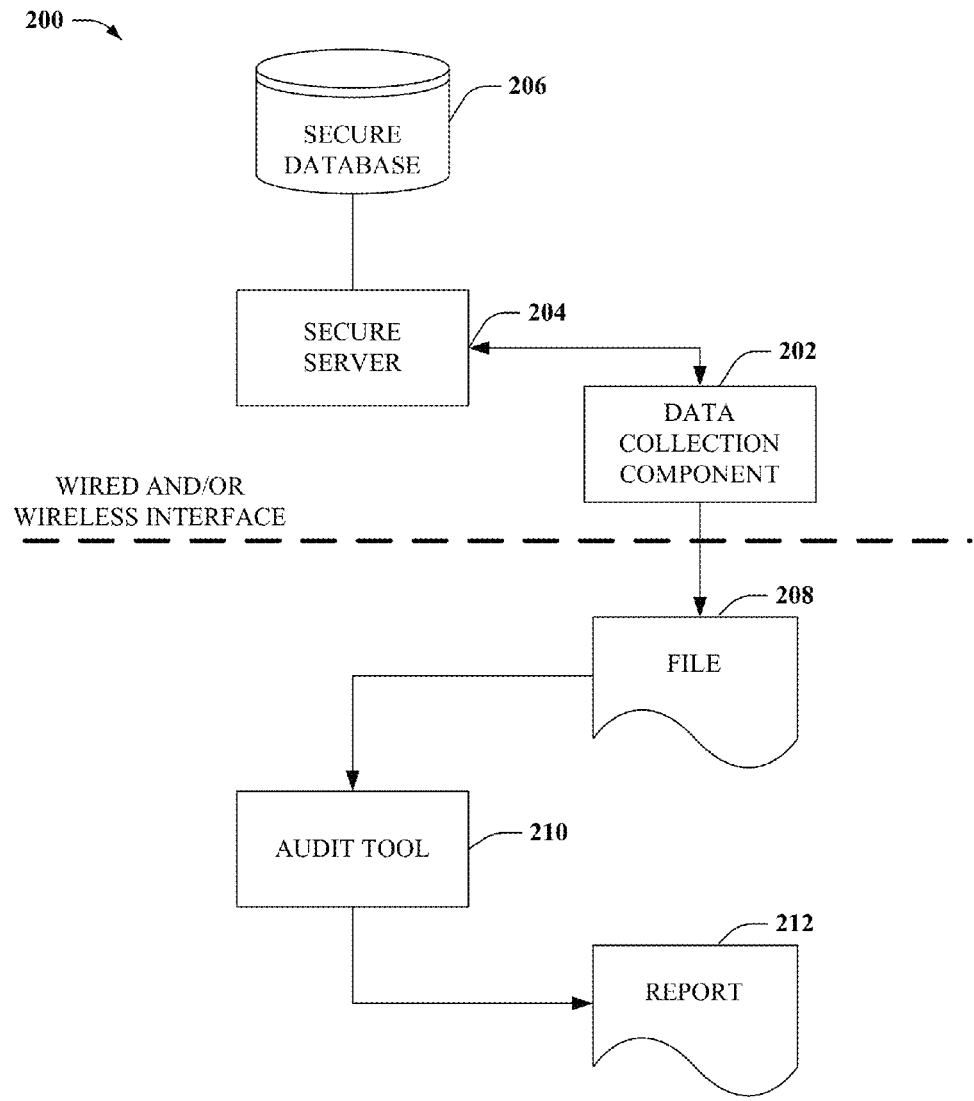
FIG. 2 depicts a block diagram of a sample system that comprises a distributed data collection audit mechanism according to aspects.

FIG. 2 illustrates a block diagram of a sample system 200 that can provide secure analysis of secure communication systems (204, 206) according to some aspects described herein. Network servers (204) and databases (206) often contain sensitive and confidential information. Thus, data mining tools, even utilized for system management or maintenance, can represent a potential security breach. In addition, such systems (204, 206) often have protected/encrypted communication interfaces (not depicted), unexposed APIs, and the like. Accordingly, a need exists for a secure interface with protected systems to provide automated maintenance, management and upgrade functions, from a local or remote source.

Data collection component 202 can comprise a stand-alone executable module. Such module (202) can be distributed to network operators, support professionals, etc. to interface with secure system components (204, 206) and obtain data, data configuration and data structure information associated with such components (204, 206). The data can be utilized to provide an audit of the components (204, 206) or upgrade the components to newer operating systems, including additional applications, unify legacy applications, update application versions, and the like.

Server 204 can be any suitable network communication server having a secure interface or unexposed API interface. As an example, server 204 can include a call management server having private API access. Such server can require specific login information, encrypted signature(s), or other suitable authentication information in order to access the server 204 or a corresponding secure database 206. In some embodiments, a local computer (not depicted) can be required to interface with server 204 and/or database 206. In such circumstances, a data collection interface (202) could be installed on the local computer to interface with the secure network components (204, 206).

As a stand-alone executable module, data collection component 202 can be installed on a local network device (e.g., local computer, terminal, server, etc.) to interface with server 204 and database 206. Alternatively, or in addition, a local maintenance entity can execute and interface the data collection component 202 with the server 204 or database 206 utilizing secure access configured for the entity (e.g., a username/password combination, digital certificate, virtual private network [VPN] login, etc.). In other aspects, secure access information can be loaded into the data collection component 202 to enable and authorize a data collection interface with the server 204 and/or database 206. Accordingly, as a stand-alone module, data collection component 202 can interact with private components (204, 206) in a secure manner.

Once coupled with secure network components (204, 206), the data collection component 202 can utilize intelligent queries involving multiple APIs, as described herein. In some aspects, APIs can provide access to various portions of server 204 or database 206. Particularly, SNMP polls can determine a type and version of application software on the server 204 and database 206. Results of the SNMP polls can be utilized to configure other API queries of management, routing, messaging, usage tracking, charging, maintenance, and like network system functions. In some aspects, APIs associated with a secure server 204 or database 206 can be private, and unexposed via an external interface (e.g., local or wide area network). In such case data collection component 202 can utilize an internal API once configured to the secure system (204, 206), as discussed above. As described, data collection component 202 can extract information from secure network components (204, 206) while mitigating exposure to conventional data mining techniques.

Data and configuration information extracted by data collection component 202 can be written to a secure output file 208. Such a file 208 can be encrypted, password protected, scrambled or coded, and/or transformed by various other mechanisms for securing digital information, as known in the art. The output file 208 can therefore be protected against intrusion by unauthorized sources.

File 208 can be provided to audit tool 210 for secure analysis. The file 208 can be transmitted over a data network, such as the Internet, via a secure connection (e.g., secure socket layer [SSL], transport layer security [TLS], VPN, public key infrastructure [PKI], TLS-pre-shared key [PSK] ciphersuites, or a combination thereof or of the like). Alternatively, the file 208 can be sent by other suitable electronic transfer means, such as e-mail, file-included messaging, or via portable hard disk, flash memory, compact disc, digital video disk, and so on. Audit tool 210 can receive the file 208 and can extract pertinent data, configuration information, and data structure information from such file 208. According to some aspects, the audit tool 210 can interact with extracted data internally for maximum security, or can provide limited access to external entities (e.g., an authorized audit technician) to manually deconstruct data, provide and/or update best practice rules, or troubleshoot system incompatibilities.

In some aspects, audit tool 210 can compare information extracted from the file 208 with best practice rules pertinent to the secure server 204 and secure database 206. For instance, the audit tool 210 can first extract component (204, 206) operating system, version, and/or type information from the file 208 and apply such information to other interactions with data in the file 208. The audit tool can generate an output report 212 based at least in part on the comparison of data with best practice rules. Such rules can be modified (or additional rules can be referenced), where appropriate, depending on system version and/or type information. The output report 212 can be secured in a similar manner as the file 208 (e.g., encrypted, password protected, scrambled, coded, transformed etc.). The output report 212 can be submitted to a service provider, maintenance technician, or the like, associated with the network components 204, 206. Accordingly, system 200 provides a secure mechanism to extract and analyze data from private network components 204, 206 to provide management, maintenance and/or update information for such components 204, 206.

Figure 3:
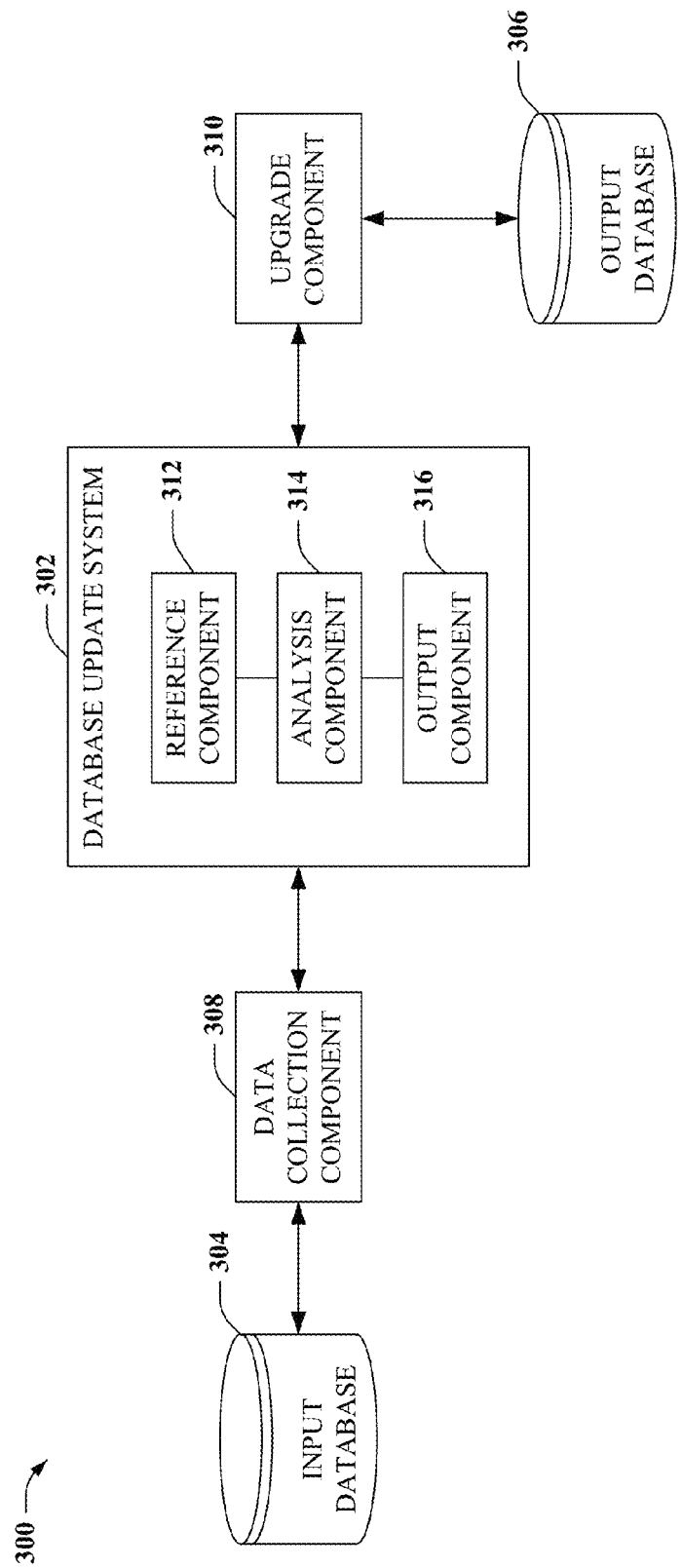
FIG. 3 illustrates a block diagram of an example system that can upgrade a database to a newer standard and/or protocol.

FIG. 3 depicts a block diagram of an example system 300 that provides upgrade services for a network communication device (304) according to one or more aspects of the subject disclosure. Specifically, system 300 can provide for extraction of data from a first database (304) and writing such data to a second, similar database 306. The data can be modified as suitable to conform to best practice rules pertinent to the devices (304, 306), and as suitable for any changes in database type, operating system, or application systems of the devices (304, 306). Accordingly, system 300 provides a dynamic mechanism to port data from a first device (304) to a second (306) for backup, recovery, and/or dynamic system upgrade purposes.

System 300 can include a database update system 302 that receives data extracted from an input database 304 by a data collection component 308. Data received by the database update system 302 can be written to an output database 306 by an upgrade component 310. Input database 304 and output database 306 can be of like types and utilize similar management software (e.g., management application, operating system) and similar versions of such software. In such case database update system 302 can provide analysis and/or backup and recovery services for input database 304. In other cases, input database 304 and output database 306 can be of different database types, or have different software or versions of such software (e.g., version 1.0 of an operating system vs. version 2.0 of an operating system). In such case, database update system 302 can function to port data between databases and reconfigure the data, if needed, to provide upgrade services (e.g., in lieu of or in addition to backup and recovery service).

As described herein, data collection component 308 can interface with input database 304 utilizing one or more intelligent API queries and extract data, data configuration and data structure information there from. The extracted information can be forwarded to database update system 302. Such system 302 can include a reference component 312 that contains best practice rules associated with the input database 304 and output database 306. Thus, information pertinent to the type, application(s), and/or operating system associated with input database 304 can be represented with such best practice rules. Further, information pertinent to the type, application(s), and/or operating system associated with output database 306 can also be represented by the best practice rules. Accordingly, modifications to data extracted from the input database 304, required for compatibility with output database 306, can be determined, at least in part, based on the best practice rules. In some aspects, reference component 312 can dynamically modify the best practice rules upon successive interactions with the input database 304 or the output database 306.

An analysis component 314 can compare the data provided by the data collection component 308 with the best practice rules stored at reference component 312. The comparison can identify changes to the data in compliance with the rules of best practice as described herein (e.g., configuration efficiency, possible improvements, appropriate redundancy). In addition, changes to the data required by any disparity in database type, application(s) and/or operating systems of the databases 304, 306 can be identified by the analysis component 314. Results of the comparison(s) performed by analysis component 314 can be provided to output component 316. Output component 314 can then convert the information provided by analysis component 314 to a format usable by the upgrade component 310.

Upgrade component 310 can write data extracted from the input database, and analyzed and/or modified by database update system 302, to an output database 306. It should be appreciated that output database 306 can be of a similar or different type as input database 304 (e.g., having different applications/software, operating systems or operating system versions, etc.). Information written to the output database 306 can be in accordance with best practice rules, determined by analysis component 314 for instance, that are pertinent to the output database 306. Further, upgrade component 310 can dynamically modify a manner in which data is written to the output database 306. For instance, upgrade component 310 can interface with analysis component 314 to identify changes to the manner in which data is written to the output database 306 based on feedback from such database 306 and/or the best practice rules contained at reference component 312. Accordingly, system 300 can port data from one database to another, utilizing intelligent and comprehensive queries to extract the data from a first database, and utilizing an interactive approach to update or modify the data, as suitable, to write such data to a second database 306.

Figure 4:
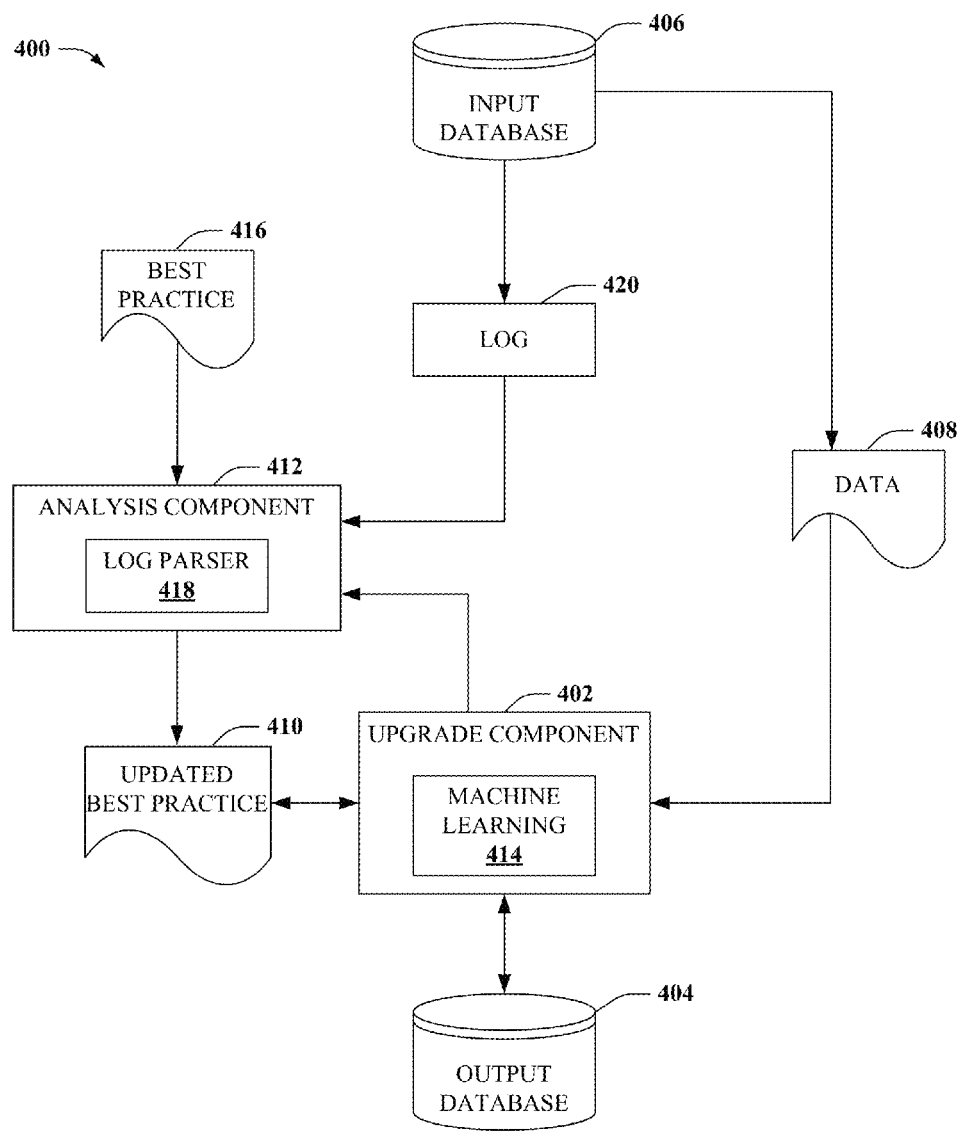
FIG. 4 depicts a block diagram of an example system that can dynamically upgrade a database according to further aspects of the subject disclosure.

FIG. 4 depicts a block diagram of an example system 400 that can dynamically upgrade a database (404, 406) according to further aspects of the subject disclosure. System 400 can intelligently interact with an output database 404 to determine changes required to data, data structures and/or data configurations (408) to properly populate an output database 406. Feedback from the output database 404 can be dynamically analyzed to update iterative interactions with the output database 404. Accordingly, system 400 provides a dynamic structure that can improve data writing mechanisms upon interaction with various types and versions of databases (404, 406).

System 400 can include an upgrade component 402 that receives data 408 to be written to the output database 406. Such data 408 can be of a particular format (e.g., XML) extracted from an input database 406. Upgrade component 402 can reference a set of best practice rules (410, 416) provided by an analysis component 412. Such rules 410 can optionally be updated based on feedback provided by the output database 404 and upgrade component 402, as described below.

The upgrade component 402 can include machine learning 414 that provides a dynamic and intelligent mechanism to adjust a manner in which data is written to output database 404 based on one or more interactions with the database 404. More specifically, machine learning 414 can iteratively write data (408) extracted from a first database 406 to output database 404, adjusting subsequent iterations based on results of prior iterations. According to some aspects, error messages, a lack of such messages, or other feedback provided by output database 406 can be analyzed by machine learning 414 to define a configuration namespace that bridges best practice rules (410, 416) for the input database 406 and the output database 404. According to still other aspects, the configuration namespace can be utilized as a template to modify the data 408 extracted from input database 406 in accordance with updated best practice rules 410 pertinent to the output database 404. By such mechanisms or like mechanisms, machine learning 414 can make strategic determinations to optimize data written to the output database 404.

To make strategic determinations machine learning 414 can utilize a set of models (e.g., recipient preference model, input item history model, general MRU tag models of senders and/or recipients, etc.) in connection with iteratively writing data to the output database 404. The models can be based on a plurality of information (e.g., best practice rules 416 associated with the input database 406, updated best practice rules 410 associated with the output database 404, database type, installed applications, installed operating systems of such databases 404, 406, feedback provided by the output database 404, parsed log data information analyzed by an analysis component 412, etc.) Optimization routines associated with machine learning 414 can harness a model that is trained from previously collected data, a model that is based on a prior model that is updated with new data, via model mixture or a data mixing methodology, or simply one that is trained with seed data, and thereafter tuned in real-time by training with actual field data provided by the output database 404, best practice rules 410, 416, or data compiled from a log of the input database 404, if applicable.

In addition, machine learning 414 can employ learning and reasoning techniques in connection with making determinations or inferences regarding optimization decisions and the like. For example, machine learning 414 can employ a probabilistic-based or statistical-based approach in connection with modifying or updating data structures or data configurations associated with data 408 written to the output database 404. The inferences can be based in part upon explicit training of classifier(s) (not shown) before employing the machine learning 414, or implicit training based at least upon manual input and the like during use of a device (400). Data or policies used in optimizations can be collected from a specific database (404, 406) or from a community of databases (404, 406) of various types, various applications and/or operating systems, for instance.

Machine learning 414 can also employ one of numerous methodologies for learning from data and then drawing inferences from the models so constructed (e.g., Hidden Markov Models (HMMs) and related prototypical dependency models, more general probabilistic graphical models, such as Bayesian networks, e.g., created by one or more structure searches using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. As a non-limiting example, classifiers can be trained on a set of feedback provided by output database 404, data 408, and/or best practice rules (410, 416), as described herein. As more interaction with the output database 404 occurs, the classifiers can be retrained. When an item is received (or, e.g., displayed/presented to the device user) machine learning 414 can execute one or more classifiers to generate changes to data as written to the output database 404.

Methodologies employed by machine learning 414 can also include mechanisms for the capture of logical relationships such as theorem provers or more heuristic rule-based expert systems. Inferences derived from such learned or manually constructed models can be employed in optimization techniques, such as linear and nonlinear programming, that seek to maximize some objective function. For example, manipulating data 408 to be compatible with output database 404 can be based on iterative interactions with the output database 404, feedback analyzed to produce a configuration namespace that bridges typical data configurations between the input database 406 and output database 404, and/or best practice rules (410, 416) pertinent to such databases 404, 406, as well as like factors suitable for data configuration optimization.

According to some aspects, analysis component 412 can include a log parser 418 that examines a data log 420 of the input database 406. The data log 420 can provide configuration history, usage history, and like information pertinent to the input database 406 and data 408. Examination of the data log 420 can provide information to update best practice rules 416 based at least in part on information associated with the data log 420.

In addition, analysis component 412 can receive feedback from upgrade component 402 and output database 404 to further modify the best practice rules (410, 416). For instance, successive interactions between machine learning 414 and output database 404 can identify distinctions between data structure and data configuration utilized by the input database 406 and output database 404. Such information can be provided to analysis component 412 to incorporate into the updated best practice rules 410. Specifically, such updated rules 410 can comprise, at least in part, a namespace that bridges protocols, configurations and structures between such databases 404, 406. The updated best practice rules 410 can be provided back to upgrade component 402 and machine learning 414 to further optimize interactions with output database 404. Accordingly, system 400 can interact with a database 404 and protocols and configuration rules associated with such database 404 to dynamically modify data 408 written to the database 404.

Figure 5:
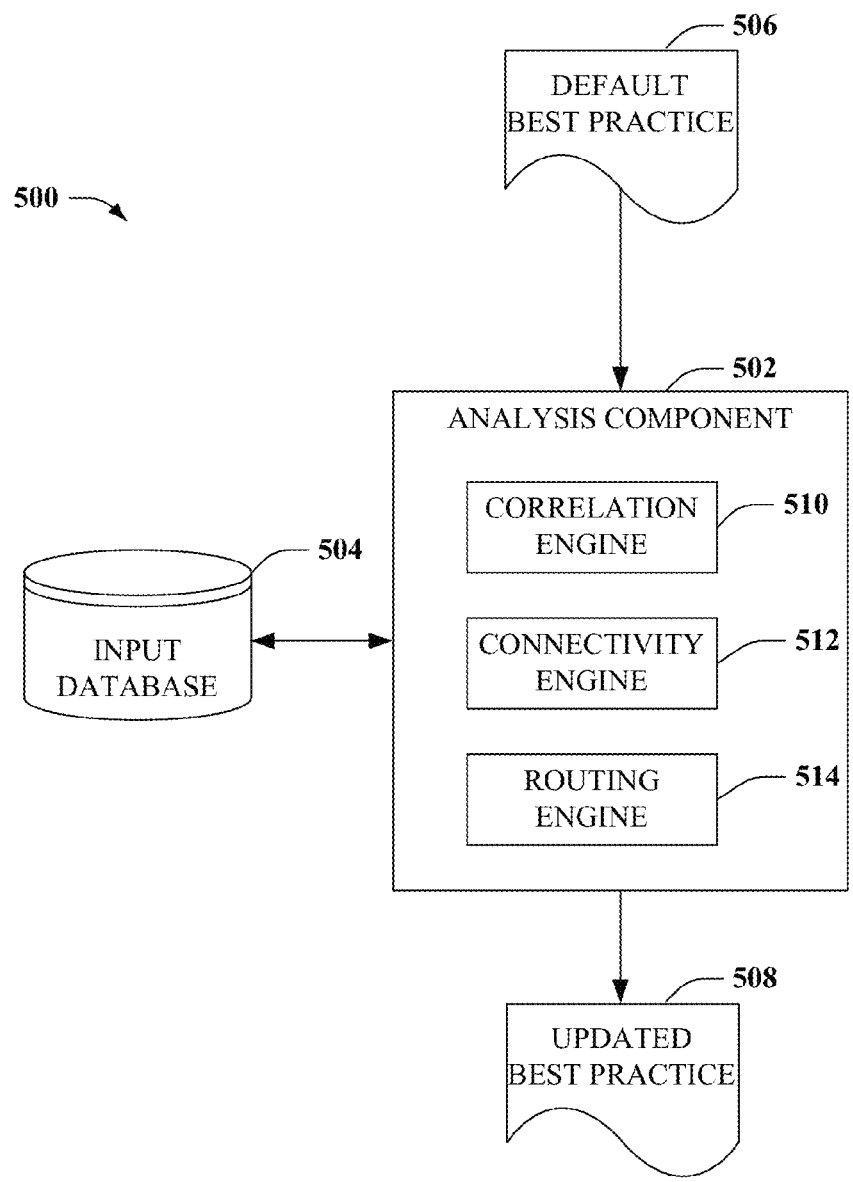
FIG. 5 illustrates a block diagram of a sample analysis component for generating updated best practice rules for upgraded systems, software, and/or standards.

FIG. 5 illustrates a block diagram of an example system 500 that can dynamically modify best practice rules pertinent to configuration, management, and/or implementation of network components and related software. System 500 can include an analysis component 502 that compares data received from an input database 504 to default best practice rules 506 provided to the analysis component 502. By analyzing defaults associated with the input database 504, the default best practices 506 can be modified to produce updated best practice rules 508 for network systems, software, and/or standards. Such rules can be utilized for configuring network components (504), providing audit reports of such components (504), or updating such components (504) to newer application or operating system versions.

According to some aspects, analysis component 502 can include a correlation engine 510 that compares general data configuration structures to the default list of best practices 506 and outputs a database stability analysis. The configuration structures can be associated with various data storage protocols, communication protocols, interface APIs, and so on, associated with the input database 504. Such structures can also be pertinent to a particular software, application, and/or operating system installed on the input database 506. The database stability analysis can be output from the analysis component 502 for other analysis and reporting functions, such as providing an audit report of the input database 504 based on the data configuration structures and list of best practices 506. It should also be appreciated that the list of best practices 506 can be updated (508) based at least in part on the database stability analysis.

In addition to the foregoing, analysis component 502 can further include a connectivity engine 512 that can compare call drop information contained in the database to the default best practice rules and output a connectivity stability analysis. Such comparison can be pertinent to call management, conferencing, messaging or like functions based in part on voice calls (e.g., circuit-switched calls or packet-switched VoIP calls). The connectivity stability analysis can be output from the analysis component 502 for reporting and/or update uses, as described herein. The connectivity stability analysis can also be utilized to modify default best practice rules 506 to generate updated best practice rules 508 pertinent to the input database 504.

Analysis component 502 can also include a routing engine 514 that can compare traffic engineering information contained in the database 504 to the list of best practices 506 and output a traffic engineering analysis. Such analysis can be also be utilized to provide an audit report for the input database 504, as well as generate and/or modify updated best practice rules 506, 508 in a similar fashion as described above. It should be appreciated that various suitable interactions between analysis component 502 and the input database 504 can be utilized to provide updated best practice rules 508. Accordingly, analysis component 502 can interact dynamically with a database and/or information extracted from such database and generate and/or modify network engineering rules of practice as a result. It should also be appreciated that such rules 506, 508 can be utilized to provide suggestions to improve efficiency, stability, redundancy and/or like properties of a network communication component (504). Further, such rules can be utilized to port data from the input database 504 to newer versions, systems, and the like, as described herein.

Figure 6:
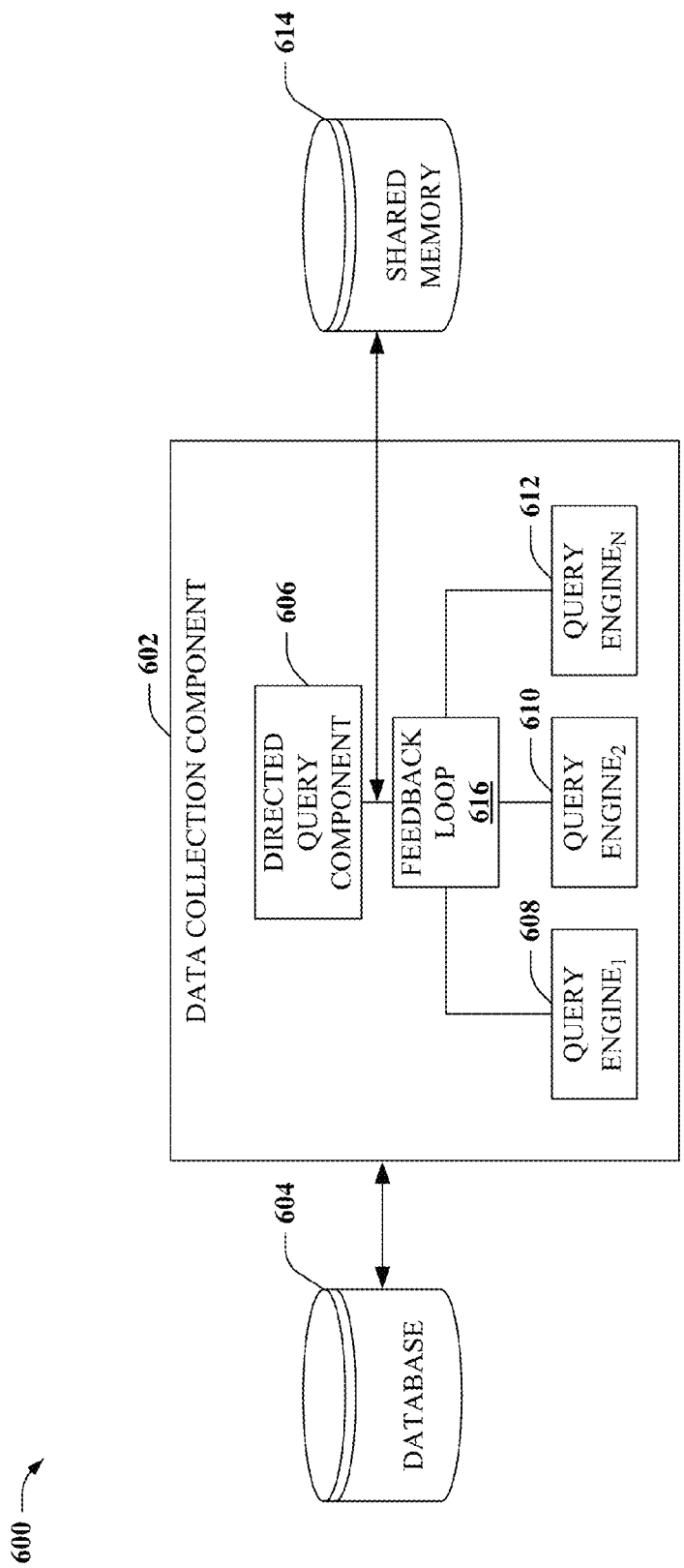
FIG. 6 depicts a block diagram of an example system that extracts data from a database utilizing structured queries.

FIG. 6 illustrates a block diagram of an example system 600 that can provide comprehensive interaction with various portions of a network communication device (604). System 600 can include a data collection component 602 that interfaces with a network database 604. The data collection component 602 can include a directed query component 606 that manages multiple query engines 608, 610, 612. The directed query component 606 can facilitate use of various communication protocols and/or APIs pertinent to data exchange with the database 604. As an example, directed query component 606 can provide the query engines 608, 610, 612 with access to SQL, XML, SNMP, SOAP, WMI, GUSI, and/or like APIs, in order to couple with the database 604 and obtain information there from. In addition, directed query component 606 can store results of such queries in shared memory 614. Accordingly, subsequent queries can be configured in accordance with information obtained from previous queries. In such a manner, data collection component 602 can provide intelligent and dynamic interface to the database 604 to extract data from all portions of such device (604).

As a particular example, a first query can utilize a first API (e.g., an SNMP poll) to identify a type of the database 604, an operating system installed on the database 604, management applications installed on the database 604, as well as version information associated with such software. Furthermore, a second query can identify different portions of the database 604 and identify functions applicable to each portion (e.g., for a unified application database 604). As a more specific example, such query can identify that various portions of database 604 perform call management, traffic engineering, messaging, and usage and billing functions for a VoIP server. Such query can also determine appropriate protocols or APIs suitable to interface with each such portion of the database 604. Information obtained as a result of a query can be stored in shared memory 614 and distributed to the query engines via feedback loop 616. Accordingly, subsequent queries can be configured according to the information obtained as a result of the previous queries. System 600, therefore, can provide substantial benefit over conventional database interface mechanisms that typically require blind copying from a first database (604) to a second database. Instead, data collection component 602 can dynamically interact with the database 604 and extract information according to the protocols and applications thereof. Thus, system 600 can provide increased efficiency in interacting with a database and extracting data there from, for audit, reporting and/or update purposes.

The aforementioned systems have been described with respect to interaction between several components. It should be appreciated that such systems and components can include those components or sub-components specified therein, some of the specified components or sub-components, and/or additional components. For example, a system could include audit tool 102, upgrade component 310, machine learning 412, input database 405 and output database 404, or a different combination of these and other components. Sub-components could also be implemented as components communicatively coupled to other components rather than included within parent components. Additionally, it should be noted that one or more components can be combined into a single component providing aggregate functionality. For instance, reference component 312 can include analysis component 314, or vice versa, to facilitate maintenance of best practice rules and comparison of received data with such rules by way of a single component. The components can also interact with one or more other components not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

Figure 7:
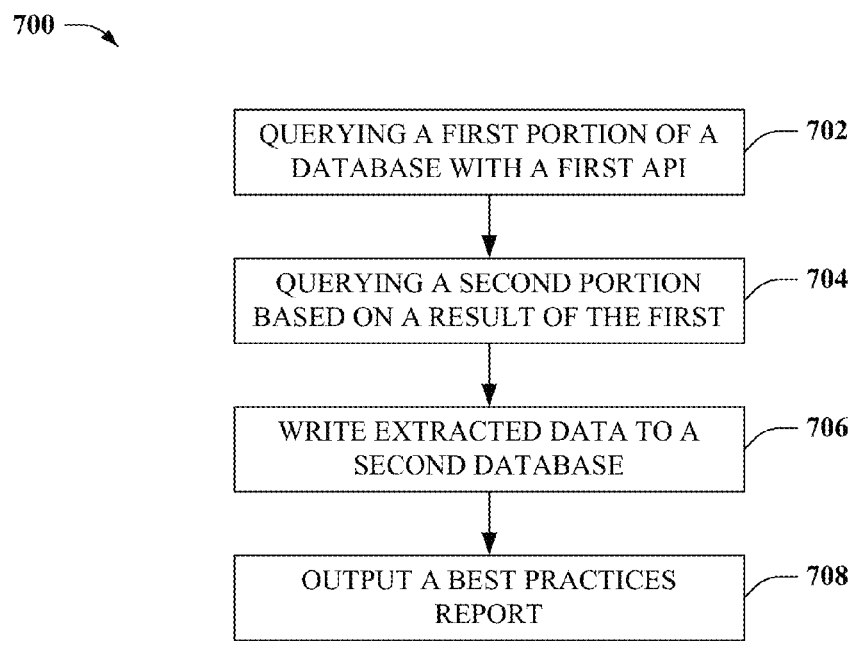
FIG. 7 depicts a flowchart of an example methodology for auditing network equipment according to one or more aspects.
Figure 8:
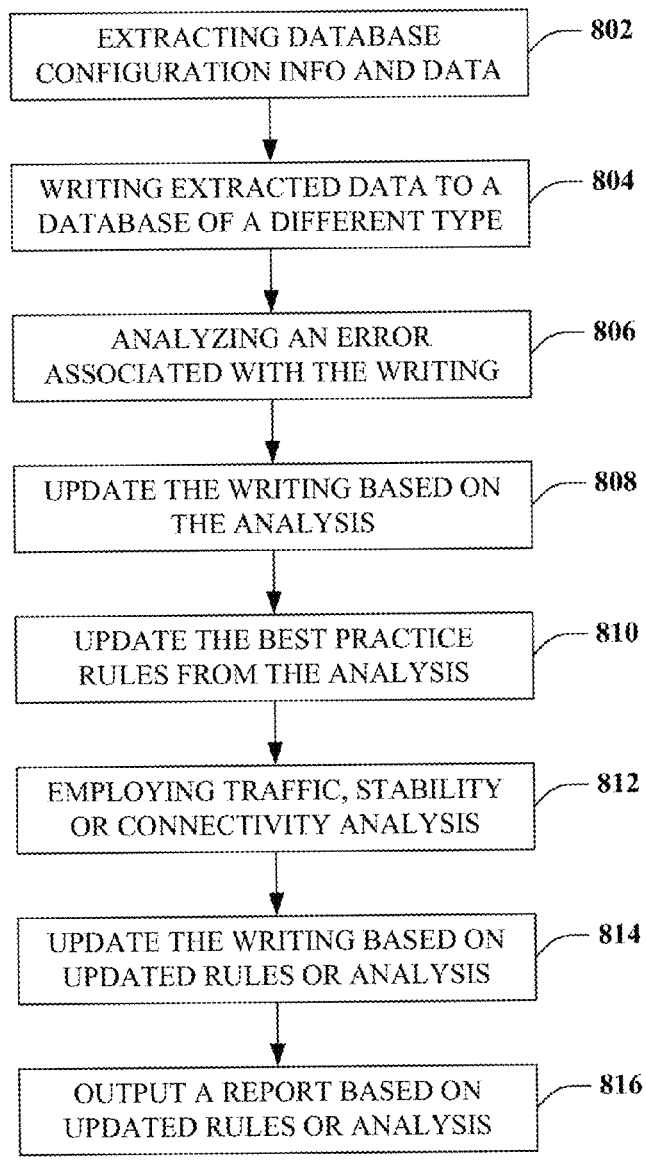
FIG. 8 depicts a flowchart of a sample methodology for updating network components to new software, protocols, and/or standards according to further aspects.

In view of the exemplary systems described supra, methodologies that may be implemented in accordance with the disclosed subject matter will be better appreciated with reference to the flow charts of FIGS. 7-8. While for purposes of simplicity of explanation, the methodologies are shown and described as a series of blocks, it is to be understood and appreciated that the claimed subject matter is not limited by the order of the blocks, as some blocks can occur in different orders and/or concurrently with other blocks from what is depicted and described herein. Moreover, not all illustrated blocks are necessarily required to implement the methodologies described hereinafter. Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, conductive carrier interface, or media.

FIG. 7 depicts an example flowchart of a methodology 700 for providing dynamic auditing of network communication components. At 702, method 700 can query a first portion of a database utilizing a first API. Such portion can be managed by a segment of a unified management application, and can comprise call management, data routing, device connectivity, conference calling, device/network troubleshooting, usage tracking, billing, and/or like functions of a network. In addition the API can be configured to interface with the first portion according to a function associated with such portion. For instance, an ODBC/SQL API can be utilized in conjunction with a portion of the database pertaining to charging or billing functions. As a further example, structured SNMP polls can be utilized to obtain database, application or operating system version or type information, and so on.

At 704, method 700 can query a second portion of the database based at least in part on a result of the first query. For instance, the second query can interface with a second portion of the database in a manner determined in part by a result of the first query. As a more specific example, if the first query identified a charging and billing portion of the database, the second query can be configured to utilize an ODBC/SQL API to interact with the billing portion of the database.

At 706, method 700 can write data extracted from the database to a second database. A manner in which data is written can be based at least in part on data extracted from the database. Also, the second database can be similar to the database (e.g., having a similar operating system and application software) or can be of a different type, having different operating system(s), application software or versions of such software. In the former case, method 700 can provide backup and recovery services by porting data from the database to the second database. In the latter case, method 700 can provide update services (in addition to or in lieu of backup services) by porting data from a first type of database (e.g., an older version) to a second type of database (e.g., a newer version of the database).

At 708, method 700 can output a best practices result based on the queries. The best practice result can be based, at least in part, in a comparison of results of queries conducted at reference numbers 702 and 704 and a list of best practice rules pertinent to the database. Further, the best practice result can be configured to identify inefficiencies, lack of sufficient redundancy, or traffic stability drawbacks associated with the database or a related network. Accordingly, method 700 provides for informed queries to a database to extract data from such database, and write the extracted database to a new database, or provide a best practice audit report of such database, or both.

FIG. 8 provides a flowchart of an example methodology 800 for updating database information from prior components to newer components or versions of such components. At 802, method 800 can extract database configuration information and other data or data structures from a network database. Extraction can utilize multiple APIs and/or API queries to interact with various databases and/or portions of such databases (e.g., involved in network management and tracking functions). In addition, the extraction can be conducted such that information provided by one query is made available to subsequent queries. In further embodiments, a frequency of queries and/or data rate resources (e.g., requested bandwidth) can be limited to reduce load on the database, for instance where normal traffic requirements are high.

At 804, method 800 can write extracted data to a database of a different type, having a different operating system, or having a different arrangement of applications or unified applications as compared with the network database. At 806, method 800 can analyze feedback, such as an error, associated with writing the extracted data to the database of the different type. At 808, subsequent writing iterations can be updated in response to the analyzed feedback. Specifically, data can be organized into a particular structure, or configured in a particular manner, and so on, based on the analyzed feedback and/or based on a related structure/configuration of the network database. At 810, a set of best practice rules pertinent to the network database and/or the database of the second type can be updated or generated based at least in part on the analyzed feedback.

At 812, method 800 can employ traffic, stability and/or connectivity analysis in conjunction with transferring data from the network database to the database of the second type. Such analysis can be based on data extracted from the network database, for instance. Further, the analysis can be compared with the best practice rules to identify potential problems associated with an original data structure utilized by the network database. At 814, the writing of data to the database of the second type can be adjusted based on updated best practice rules, if any, or the analysis determined at reference number 812. At 816, an audit report can be output that identifies changes made to data extracted from the network database, if any, upon porting such data to the database of the second type. Specifically, changes determined in accordance with best practice rules and/or updated best practice rules can be identified. Further, changes in accordance with the traffic, stability and/or connectivity analysis can also be identified. According to some aspects, changes made as a result of feedback obtained from iterative writing of data to the database of the second type can also be included in the output report. Accordingly, such report can provide a summary of changes made to data, and reasons for such changes (e.g., increased stability, compatibility with a new database, etc.), and the like.

Figure 9:
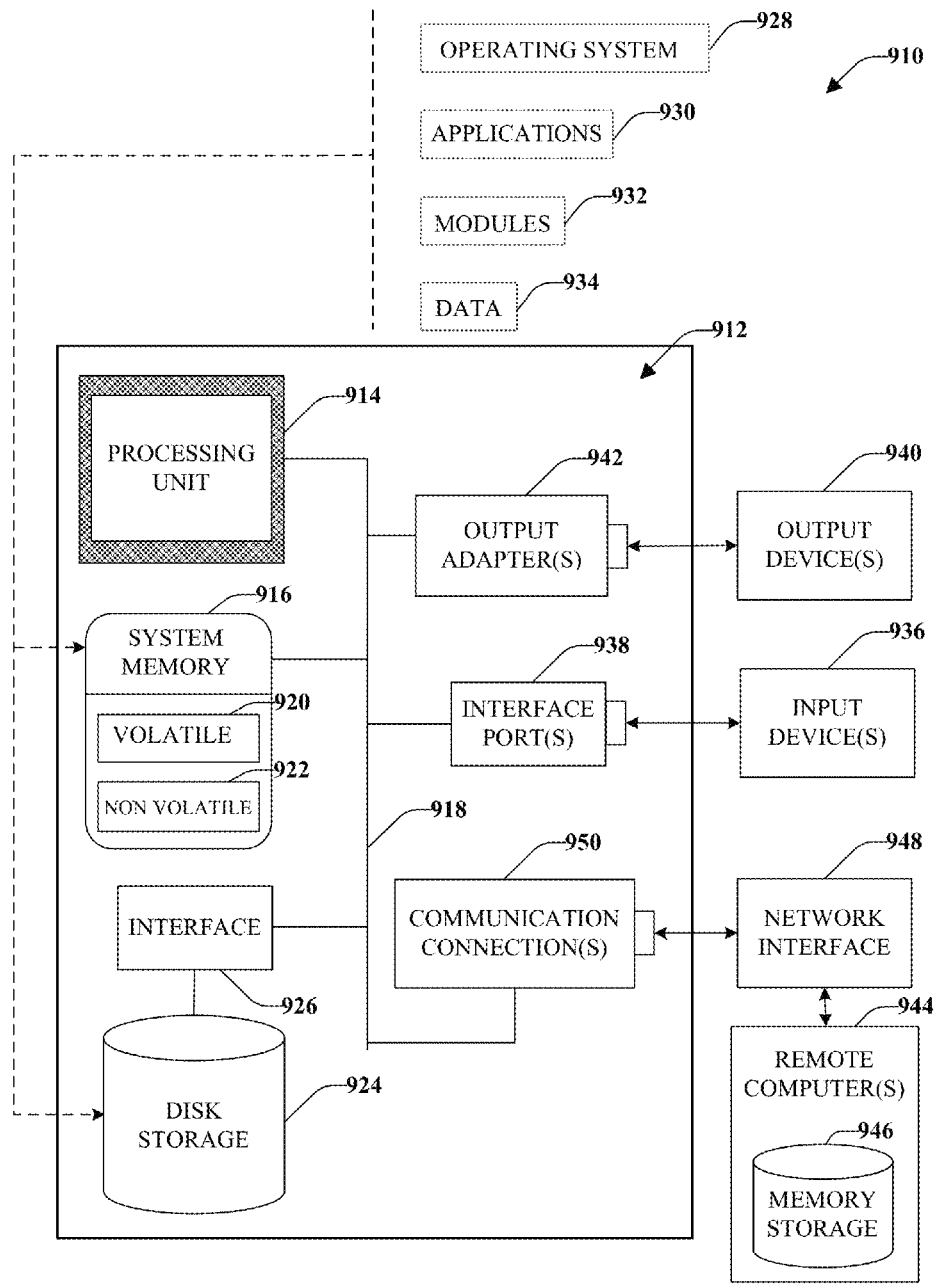
FIG. 9 illustrates a sample operating environment for interfacing with electronic components to implement various aspects described herein.

In order to provide additional context for various aspects of the disclosed subject matter, FIG. 9 as well as the following discussion is intended to provide a brief, general overview of a suitable environment in which the various aspects of the disclosed subject matter can be implemented. For instance, logic and/or operational functions related to generating intelligent and interactive database queries, analyzing query results, writing data to an output database, updating iterative writing according to feedback provided by such database, and the like, can be implemented by one or more computer processing functions as described below. While the subject matter has been described herein in the general context of block diagrams and block components, those skilled in the art will recognize that various portions of the disclosed subject matter can also be implemented in combination with computer-executable instructions of a computer program, for instance that run on a computer and/or computers, other like program modules.

Generally, program modules include routines, programs, components, data structures, etc. that can perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant [PDA], phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the invention can be practiced on stand-alone computers. In a distributed computing environment, program modules can be located in both local and remote memory storage devices, described below.

With reference to FIG. 9, an example environment 910 for implementing various aspects disclosed herein includes a computer 912 (e.g., desktop, laptop, server, hand held, programmable consumer or industrial electronics . . . ). The computer 912 includes a processing unit 914, a system memory 916, and a system bus 918. The system bus 918 can couple system components including, but not limited to, the system memory 916 to the processing unit 914. The processing unit 914 can be any of various microprocessors, such as dual microprocessors, quad microprocessors, and other multiprocessor architectures suitable for a computer environment 910.

The system bus 918 can be any of several types of suitable bus structure(s) including the memory bus or memory controller, a peripheral bus or external bus, and/or a local bus using any suitable variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/nonvolatile computer storage media. FIG. 9 illustrates, for example, disk storage 924. Disk storage 924 includes, but is not limited to, devices such as a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in operating environment 910. Such software can include an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that the present invention can be implemented with various operating systems or combinations of operating systems.

A user can enter commands or information into the computer 912 through input device(s) 936. Input devices 936 can include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 can utilize some of the same type of ports as input device(s) 936. Thus, for example, a USB port may be used to provide input to computer 912 and to output information from computer 912 to an output device 940. Output adapter 942 is provided to illustrate that there are some output devices 940 like displays (e.g., flat panel and CRT), speakers, and printers, among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and can typically include many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for example, internal and external technologies such as, modems including regular telephone grade modems, cable modems, power modems and DSL modems, ISDN adapters, and Ethernet cards or components.

Figure 10:
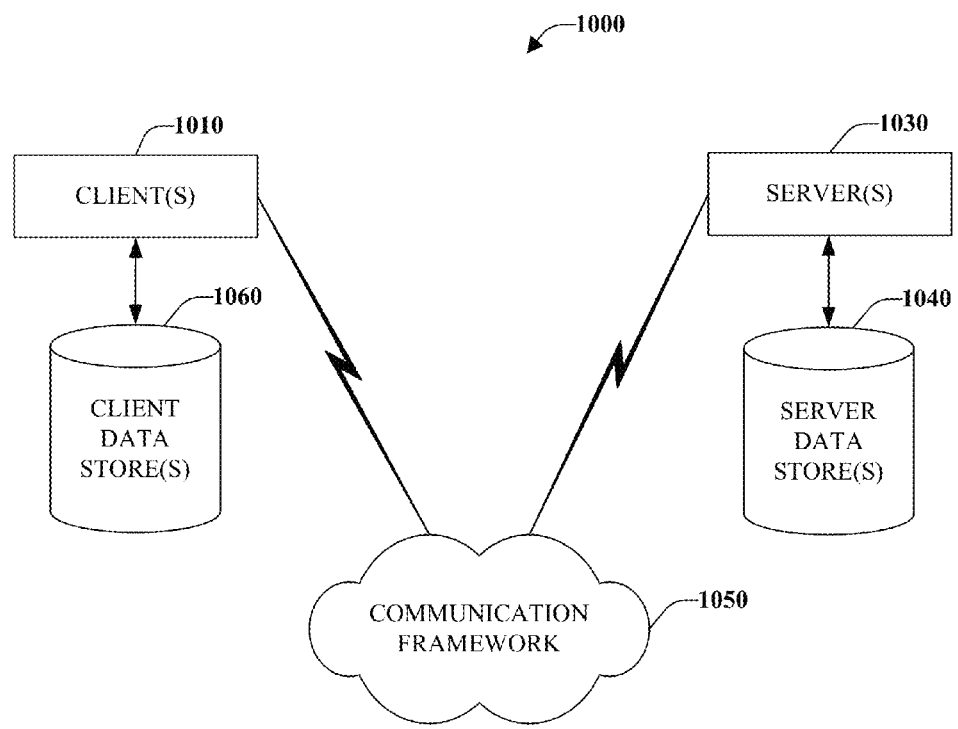
FIG. 10 depicts a sample networking environment that provides remote communication in conjunction with auditing electronic equipment.

FIG. 10 is a schematic block diagram of a sample-networking environment 1000 that can be utilized to provide remote electronic data exchange. For instance, data collection from a first network device and/or data written to a second network device can be conducted by way of a remote client/server interface, or logic associated with analyzing collected data, for instance from a stand-alone data collector, or providing an audit report in response to the collected data can be conducted via such client/server interface. The system 1000 includes one or more client(s) 1010. The client(s) 1010 can be hardware and/or software (e.g., threads, processes, computing devices). The system 1000 also includes one or more server(s) 1030. Thus, system 1000 can correspond to a two-tier client server model or a multi-tier model (e.g., client, middle tier server, data server), amongst other models. The server(s) 1030 can also be hardware and/or software (e.g., threads, processes, computing devices). The servers 1030 can house threads to perform transformations by employing the present invention, for example. One possible communication between a client 1010 and a server 1030 may be in the form of a data packet adapted to be transmitted between two or more computer processes.

The system 1000 includes a communication framework 1050 that can be employed to facilitate communications between the client(s) 1010 and the server(s) 1030. The client(s) 1010 are operatively connected to one or more client data store(s) 1060 that can be employed to store information local to the client(s) 1010. Similarly, the server(s) 1030 are operatively connected to one or more server data store(s) 1040 that can be employed to store information local to the servers 1030.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

The above description is intended by way of example only.

What is claimed is:

1. A method comprising:
    querying a first portion of a first component of a telecommunication network;
    extracting from the first portion, configuration information about a configuration of the first component;
    selecting at least one best practice rule associated with the first component from a list of best practice rules associated with components of the telecommunication network;
    comparing the extracted configuration information to the selected at least one best practice rule; and
    generating a report indicating a result of the comparison.

2. The method of claim 1, further comprising updating the configuration of the first component based on the result of the comparison.

3. The method of claim 1, further comprising updating the best practice rule associated with the first component based on the result of the comparison.

4. The method of claim 1, wherein the telecommunications network comprises a unified communications network.

5. The method of claim 4, wherein the first portion of the first component includes at least one of a voice over Internet Protocol (VoIP) call management database, a voicemail database, or a voice gateway.

6. The method of claim 1, further comprising querying a second portion of the first component based on information returned from the querying of the first portion of the first component.

7. The method of claim 6, wherein querying the first portion and the second portion uses at least one application programming interface (API) selected from a group consisting of structured query language (SQL), extensible markup language (XML), simple network management protocol (SNMP), simple object access protocol (SOAP), windows management instrumentation (WMI), and grand unified socket interface (GUST).

8. An apparatus comprising:
    a communication interface configured to enable to communicate with components of a telecommunications network; and
    a processing unit configured to:
        direct a first query via the communication interface to a first portion of a first component of the telecommunication network;
        extract from the first portion, configuration information about a configuration of the first component;
        select at least one best practice rule associated with the first component from a list of best practice rules associated with components of the telecommunication network;
        compare the extracted configuration information to the selected at least one best practice rule; and
        generate a report indicating a result of the comparison.

9. The apparatus of claim 8, wherein the processing unit is further configured to direct the first component, through the communication interface, to update the configuration of the first component based on the result of the comparison.

10. The apparatus of claim 8, wherein the processing unit is further configured to update the best practice rule associated with the first component based on the result of the comparison.

11. The apparatus of claim 8, wherein the telecommunications network comprises a unified communications network.

12. The apparatus of claim 11, wherein processor is configured to direct the first query to the first portion of the first component that includes at least one of a voice over Internet Protocol (VoIP) call management database, a voicemail database, or a voice gateway.

13. The apparatus of claim 8, wherein the processing unit is further configured to direct a second query to a second portion of the first component based on information returned from the querying of the first portion of the first component.

14. The apparatus of claim 13, wherein the processing unit is configured to direct to the first query to the first portion and the second query to the second portion using at least one application programming interface (API) selected from a group consisting of structured query language (SQL), extensible markup language (XML), simple network management protocol (SNMP), simple object access protocol (SOAP), windows management instrumentation (WMI), and grand unified socket interface (GUST).

15. One or more non-transitory computer readable storage media encoded with software comprising computer executable instructions and when the software is executed operable to cause a processor to:
    direct a first query to a first portion of a first component of the telecommunication network;
    extract from the first portion, configuration information about a configuration of the first component;
    select at least one best practice rule associated with the first component from a list of best practice rules associated with components of the telecommunication network;
    compare the extracted configuration information to the selected at least one best practice rule; and
    generate a report indicating a result of the comparison.

16. The computer readable storage media of claim 15, further comprising instructions operable to cause the processor to direct the first component to update the configuration of the first component based on the result of the comparison.

17. The computer readable storage media of claim 15, further comprising instructions operable to cause the processor to update the best practice rule associated with the first component based on the result of the comparison.

18. The computer readable media of claim 15, wherein the telecommunications network comprises a unified communications network, and further comprising instructions operable to cause the processor to direct the first query to the first portion of the first component that includes at least one of a voice over Internet Protocol (VoIP) call management database, a voicemail database, or a voice gateway.

19. The computer readable media of claim 15, further comprising instructions operable to cause the processor to direct a second query to a second portion of the first component based on information returned from the querying of the first portion of the first component.

20. The computer readable media of claim 19, further comprising instructions operable to cause the processor to direct the first query to the first portion and the second query to the second portion using at least one application programming interface (API) selected from a group consisting of structured query language (SQL), extensible markup language (XML), simple network management protocol (SNMP), simple object access protocol (SOAP), windows management instrumentation (WMI), and grand unified socket interface (GUST).

\* \* \* \* \*

UNITED STATES PATENT AND TRADEMARK OFFICE
CERTIFICATE OF CORRECTION

PATENT NO. : 9,280,604 B2  
APPLICATION NO. : 14/590120  
DATED : March 8, 2016  
INVENTOR(S) : Talal Ahmad Siddiqui Page 1 of 1

It is certified that error appears in the above-identified patent and that said Letters Patent is hereby corrected as shown below:

Claims

In Col. 22, line 3, Claim 7, delete "(GUST)" and insert --(GUSI)-- therewith.

In Col. 22, line 48, Claim 14, delete "(GUST)" and insert --(GUSI)-- therewith.

In Col. 23, line 26, Claim 20, delete "(GUST)" and insert --(GUSI)-- therewith.

Signed and Sealed this  
Fourteenth Day of June, 2016

Michelle K. Lee  
*Director of the United States Patent and Trademark Office*